J. C. TUCK.
Car-Starters.

No. 148,391.

Patented March 10, 1874.

Witnesses:
John H. Redstone
Geo. Wood

Inventor:
Josiah C. Tuck

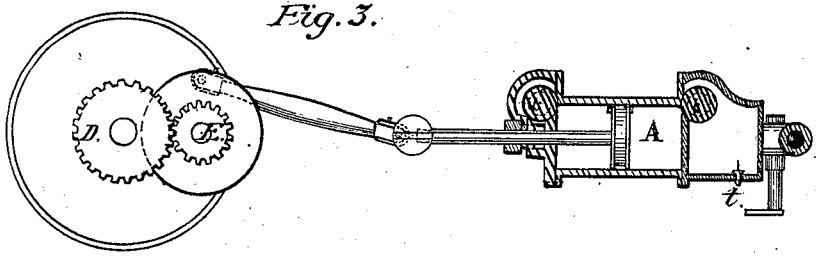
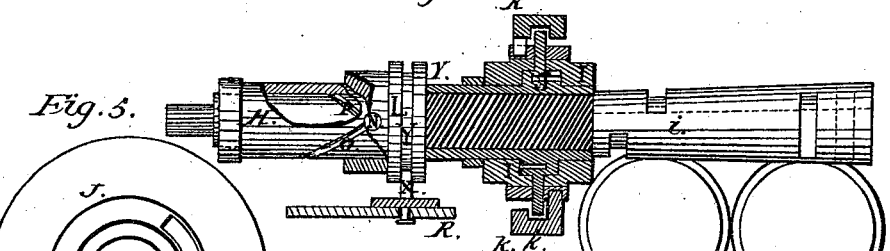
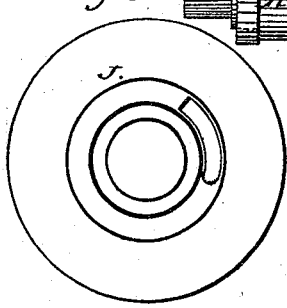
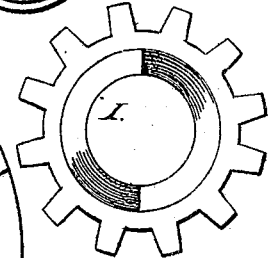
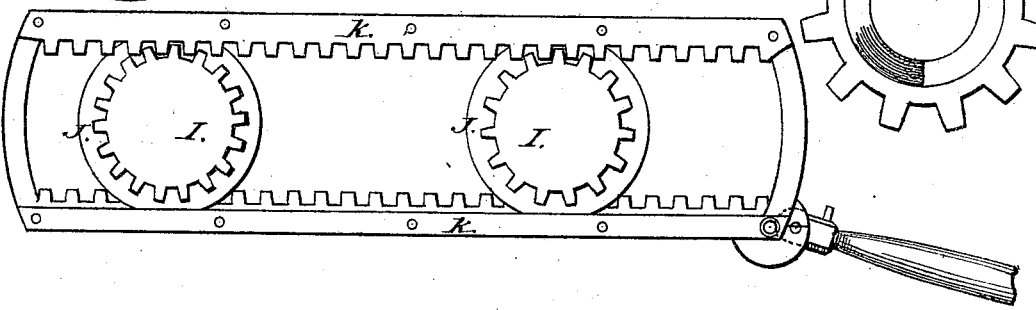

UNITED STATES PATENT OFFICE.

JOSIAH C. TUCK, OF OAKLAND, CALIFORNIA.

IMPROVEMENT IN CAR-STARTERS.

Specification forming part of Letters Patent No. 148,391, dated March 10, 1874; application filed August 16, 1873.

*To all whom it may concern:*

Be it known that I, JOSIAH C. TUCK, of Oakland, in the county of Alameda and State of California, have invented an Improvement in Street-Railway Cars, of which the following is a specification:

The object of my invention is to combine in one machine a car-brake and car-starter, and a utilization of the weight of the car by storing power acquired in descending a grade, to be employed as an assistant in ascending a grade.

Figure 1:
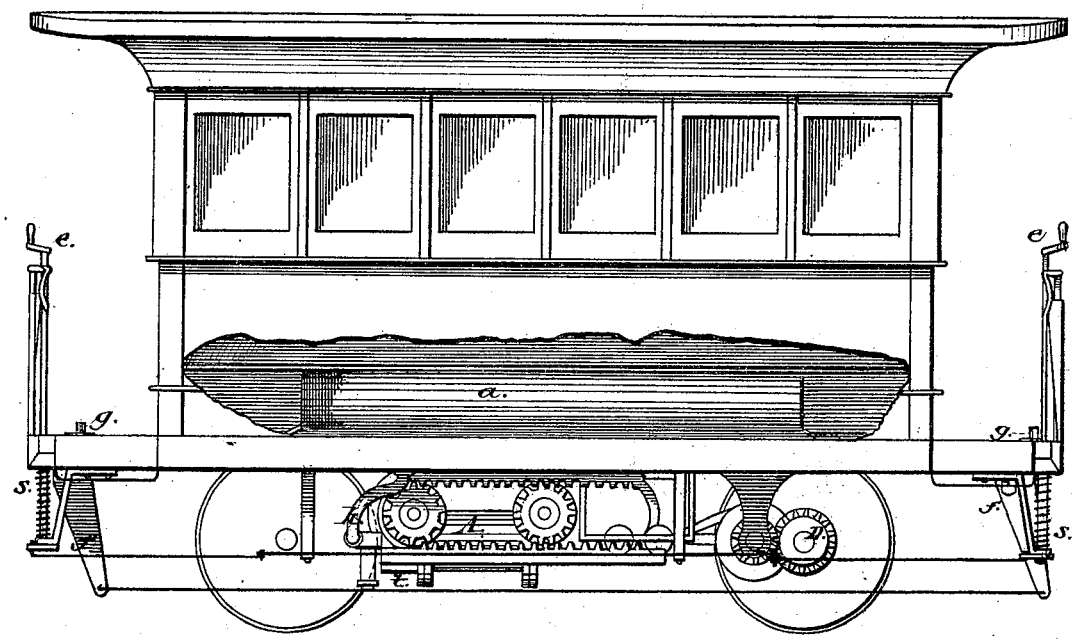
Figure 2:
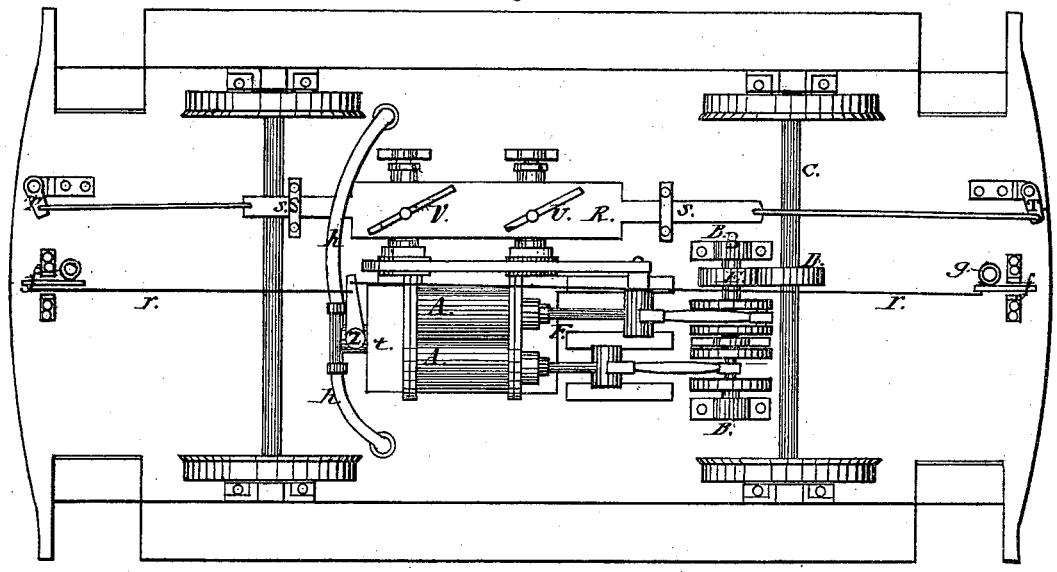

In the accompanying drawing, forming a part of this specification, Figure 1 is a side elevation, with a section cut out to show the air-chamber, and showing the general arrangement of the machinery. Fig. 2 is an under-plane view, showing the construction and general arrangement of the machinery. Fig. 3 is a section, showing the arrangement of the cylinders, the valve-chambers and valves, and the connection with the car-wheels by means of the connecting-rod and spur-wheels D and E. Fig. 4 is a section, showing the valve $i$, the pinions I and I', the rack $k$, the sleeve H, the ratchet or clutch-plate J, the reversing-clutch L, with a section cut out of the same to show the sleeve H, which also has a section cut out to show the slots O and P in their connection by means of the pin or wrist N. It also shows the reversing-bar R and yoke X, which operate the reversing-clutch L. The position of the cylinders A A is also shown. Fig. 5 shows the side of the clutch-plate which operates in connection with the clutch-pinion by means of the pawl W. Fig. 6 shows the clutch-pinion designed to operate the rotary valve $i$, (shown in Fig. 4.) The side is shown in order to show the projections or lips over which the pawl W in clutch-plate J (shown in Fig. 5) operates. Fig. 7 shows the valve-rack $k$ and the clutch or ratchet pinions I, which operate the valve. The position of the clutch-plate J is also shown, as well as the connection of the rack with the pitman or connecting rod at each stroke of the piston, imparting motion to the valves.

The same letters refer to the similar parts in the different figures.

A represents the cylinders; B, the crank-shaft; C, the car-axle; D, a spur-wheel upon the car-axle; and E, spur-wheel upon the crank-axle. F is the forward valve-chamber, and G the rear valve and cushion chamber. H is the sleeve upon the valve-stem, and J is a ratchet or clutch disk, attached to the same for the purpose of operating the clutch-pinions I by means of the pawl W, (shown in Fig. 5.) L is a shifting-clutch, designed to reverse the valves by means of the pin or wrist N, which operates in the reverse spiral slots O and P. The shifting-clutch L has the concentric groove Y, in which the yoke X operates by means of the reversing-bar R, which is connected by means of the angular slots U and V, operating upon the pins or wrists on the yoke X. The reversing-bar R operates in the guide-boxes S by means of the crank $e$, the shaft and spring $s$, and the rods Q. The throttle-valve Z connects with the air-chamber through the pipe $h$, and is operated by means of the foot-post $g$, the elbow-lever $f$, and the rods $r$.

The following is the operation of the machine: As the car is moved forward upon a descending grade, the traction of the wheels rolling upon the rail gives motion to the gear D and E, thereby operating the crank-shaft B, and giving motion to the pistons, and operating the cylinders A. The connection is opened to the chamber $a$ through the throttle-valve Z and pipe $h$. The air received into the cylinders is pumped into the chambers $a$ at each stroke of the pistons. The connection with the chamber $a$ is closed when the bottom of the grade is reached, or as soon as a sufficient pressure is obtained, and the valves $i$ are reversed by means of the reversing-bar R with angular slots U and V, which is operated by means of the crank $e$, the crank T, and the rod Q. The bar R, sliding in the guide-boxes S, gives a lateral motion to the yoke X, causing the shifting-clutch L to operate the valve-stem by means of the pin or wrist N, operating in the spiral slot O in the sleeve, and the reverse spiral stop P in the valve-stem, thereby reversing the relation of the ports of the rotary valve $i$ with the cylinders A. By this arrangement, the valves are opened at each backward stroke, and at each forward stroke the check-valve $t$ is raised, admitting the air freely to the back of the piston, thus allowing the piston to operate without resistance from back pressure.

When desired, the machinery may be uncoupled from the main axle by any well-known device, thereby allowing the axle to revolve freely. When about to ascend a grade, the machinery being coupled firmly and the valves $i$ adjusted to give off power to the forward motion of the car, the throttle-valve Z is opened, connecting with the pressure-chambers $a$ through the pipes $h$, when as much pressure is given to the pistons as is required to assist the team in ascending the grade. By this, very much assistance may be rendered when ascending difficult grades, with no extra expense, but by simply utilizing the force actually necessary in holding or breaking the car when descending a grade. When the top of the grade is reached, the valve Z is again closed, as before, and the valves $i$ reversed, so as to allow the machinery to operate freely and independent of the pressure in the air-chambers.

To break the car when stopping, the valves are again reversed, and, the throttle-valve being closed, the piston-head, cushioning upon the air in the cylinder and cushion-chamber, is brought to a stand, thereby stopping the car; and, when again ready to start, the valves are again reversed, giving power to the forward motion of the car.

Whenever power is being given off, the foot of the operator is placed and held upon the foot-post $g$ and the elbow-lever $f$, and holding the valve Z open by means of the rods $r$. At all other times the throttle remains closed.

One great advantage of this invention over other car-starters is seen in its use upon an ascending grade when no power is given to the machinery by the momentum of the car in stopping. By opening the communication with the pressure-chambers $a$, the pressure is at once applied to give motion to the car, as has been described.

In operating the valves $i$, the clutch-pinions I operate the clutch-plate J continuously in one direction, making one-half of a revolution at each forward or back stroke of the piston, or one whole revolution at each full stroke of the crank, as follows, to wit: As the double rack $k$ (shown in Fig. 7) is moved forward, the top rack gears with the pinion I, which is in gear with the clutch-plate J, (shown in Fig. 7,) by means of the pawl W, operating against the lips of the clutch-pinion I, (shown in Fig. 6.) As the rack is moved back, the pinion I upon the opposite side of the clutch-plate J, and gearing with the same in a backward motion, is operated by the lower gear of the double rack $k$, and the revolution of the valve $i$ completed.

It will be seen that a complete reverse of the relative position of the valve-ports with the cylinder, and a substitution of the place of the supply for that of the exhaust, is effected by the action of the shifting-clutch L, sliding upon the sleeve H, and operating the wrist N in the slots O and P, changing the relation of the valve-stem and valve with the sleeve H, and substituting the position of the exhaust for that of the supply port, and consequently reversing the action of the machine.

What I claim as my invention, and desire to secure by Letters Patent, is—

1. The cylinders A A, to operate in connection with the air-pressure chambers $a$, in combination with the double ratchet-bar K, pinions I I, and bearing J, all constructed and combined substantially as and for the purposes set forth.

2. The device above described for reversing the rotary valve, consisting of the shifting-clutch L with wrist N, to operate in the spiral slots O and P in connection with the yoke X, with wrists to operate in the slots U and V in the reversing-bar R, all combined substantially as set forth.

3. The combination of the clutch-pinions I with the clutch-plate J attached to the sleeve H, to operate in connection with the double rack $k$, substantially as and for the purposes set forth.

JOSIAH C. TUCK.

Witnesses:
JOHN H. REDSTONE,
GEO. WOOD.